US011040772B2

(12) United States Patent
Reddy et al.

(10) Patent No.: US 11,040,772 B2
(45) Date of Patent: Jun. 22, 2021

(54) UNMANNED AERIAL VEHICLE

(71) Applicant: DEFENDTEX PTY LTD, North Melbourne (AU)

(72) Inventors: Travis Reddy, Beaumaris (AU); Damien Cahill, Keysborough (AU)

(73) Assignee: DEFENDTEX PTY LTD, Victoria (AU)

( * ) Notice: Subject to any disclaimer, the term of this patent is extended or adjusted under 35 U.S.C. 154(b) by 0 days.

(21) Appl. No.: 15/700,436

(22) Filed: Sep. 11, 2017

(65) Prior Publication Data

US 2019/0077503 A1   Mar. 14, 2019

(51) Int. Cl.
*B64C 39/02*   (2006.01)
*B64F 1/10*    (2006.01)
(Continued)

(52) U.S. Cl.
CPC ............ *B64C 39/024* (2013.01); *B64C 1/063* (2013.01); *B64C 13/16* (2013.01); *B64C 27/08* (2013.01);
(Continued)

(58) Field of Classification Search
CPC .......... F42B 10/14; F42B 10/16; F42B 10/18; F42B 10/20; F42B 15/00; F42B 30/10; F42B 10/143; F42B 10/146; F42B 30/04; F42B 10/50; B64F 1/04; B64F 1/10; B64C 2201/088; B64C 2201/102; B64C 39/024; B64C 2201/126; B64C 11/28; B64C 27/50; B64C 1/063
See application file for complete search history.

(56) References Cited

U.S. PATENT DOCUMENTS 3,673,916 A * 7/1972 Wittholz ................ F41A 21/18
                                                                42/78
3,978,790 A * 9/1976 Sandelius ............. B63B 22/003
                                                               102/388
(Continued)

FOREIGN PATENT DOCUMENTS

DE      10115088 A1 * 10/2002  .............. F42B 10/14
FR       2846079 A1 *  4/2004  .............. F42B 10/14
(Continued)

OTHER PUBLICATIONS

Gnemmi, Patrick et al., "Aerodynamic Performance of a Gun Launched Micro Air Vehicle", International Journal of Micro Air Vehicles, vol. 4 No. 4, 2012, pp. 251-272. (Year: 2012).*
(Continued)

*Primary Examiner* — Faris S Almatrahi
*Assistant Examiner* — David A Testardi
(74) *Attorney, Agent, or Firm* — Young Law Firm, P.C.

(57) ABSTRACT

An unmanned aerial vehicle (UAV) adapted for transit in and deployment from a projectile casing is provided. The UAV includes a wing assembly coupled to the projectile casing and the wing assembly moveable between a closed position and a deployed position. The UAV further includes a propulsion system including at least one rotor disposed on the wing assembly to generate lift, wherein in the closed position, the wing assembly is substantially integral with the projectile casing and in the deployed position, the wing assembly is extended outwards from the projectile casing.

21 Claims, 6 Drawing Sheets

(51) Int. Cl.
  *F42B 10/14*    (2006.01)
  *B64C 1/06*     (2006.01)
  *B64C 13/16*    (2006.01)
  *B64C 27/39*    (2006.01)
  *B64C 27/08*    (2006.01)
  *G05D 1/00*     (2006.01)
  *F42B 30/10*    (2006.01)
  *F42B 10/58*    (2006.01)
  *F42B 15/08*    (2006.01)
  *F42B 30/04*    (2006.01)

(52) U.S. Cl.
  CPC ............... *B64C 27/39* (2013.01); *B64F 1/10* (2013.01); *F42B 10/14* (2013.01); *F42B 10/58* (2013.01); *F42B 15/08* (2013.01); *F42B 30/04* (2013.01); *F42B 30/10* (2013.01); *G05D 1/0027* (2013.01); *B64C 2201/024* (2013.01); *B64C 2201/084* (2013.01); *B64C 2201/121* (2013.01); *B64C 2201/141* (2013.01); *B64C 2201/146* (2013.01); *B64C 2201/201* (2013.01)

(56) References Cited

U.S. PATENT DOCUMENTS

| | | | | |
|---|---|---|---|---|
| 4,296,894 A | * | 10/1981 | Schnabele | F42B 15/10 244/3.1 |
| 4,307,651 A | * | 12/1981 | Batson | F41F 3/048 102/522 |
| 4,624,424 A | * | 11/1986 | Pinson | F42B 10/64 102/384 |
| 4,735,148 A | * | 4/1988 | Holtzman | F42B 14/064 102/522 |
| 5,615,847 A | * | 4/1997 | Bourlett | F42B 10/14 114/316 |
| 6,260,797 B1 | * | 7/2001 | Palmer | B64C 39/024 102/501 |
| 6,523,478 B1 | * | 2/2003 | Gonzalez | F42B 12/50 102/216 |
| 6,723,972 B2 | * | 4/2004 | Schroeder | F02K 1/008 244/3.24 |
| 6,923,404 B1 | * | 8/2005 | Liu | B64C 3/40 244/46 |
| 7,007,607 B1 | * | 3/2006 | Fong | F42B 12/10 102/400 |
| 8,115,149 B1 | * | 2/2012 | Manole | F42B 10/18 102/430 |
| 9,194,675 B1 | * | 11/2015 | Manole | F42B 14/02 |
| 9,527,588 B1 | * | 12/2016 | Rollefstad | B64C 39/024 |
| 10,392,104 B1 | * | 8/2019 | Urban | B64C 27/52 |
| 2003/0071166 A1 | * | 4/2003 | Moore | F42B 10/14 244/3.28 |
| 2005/0051667 A1 | * | 3/2005 | Ariton | G08B 13/19621 244/17.11 |
| 2011/0155840 A1 | * | 6/2011 | Lind, Jr. | B60F 3/00 244/13 |
| 2011/0180655 A1 | * | 7/2011 | Deschatre | F42B 10/14 244/3.28 |
| 2012/0043411 A1 | * | 2/2012 | Beck | B64C 39/024 244/3.24 |
| 2013/0037651 A1 | * | 2/2013 | Bruns | F42B 10/50 244/3.1 |
| 2014/0008483 A1 | * | 1/2014 | Valledor | F42B 10/06 244/3.27 |
| 2014/0299708 A1 | * | 10/2014 | Green | B64C 27/32 244/17.23 |
| 2016/0009412 A1 | * | 1/2016 | Manasseh | B64F 1/04 244/63 |
| 2016/0046372 A1 | * | 2/2016 | Barnes | B64C 39/024 244/17.19 |
| 2016/0137312 A1 | * | 5/2016 | Osterhout | B64C 39/024 244/17.23 |
| 2016/0272317 A1 | * | 9/2016 | Cho | G08G 1/09 |
| 2016/0293015 A1 | * | 10/2016 | Bragin | B64C 39/024 |
| 2017/0057635 A1 | * | 3/2017 | Strayer | B64C 39/024 |
| 2017/0283048 A1 | * | 10/2017 | Beckman | B64C 27/24 |
| 2017/0283050 A1 | * | 10/2017 | Baek | B64C 27/48 |
| 2018/0093753 A1 | * | 4/2018 | Chow | B64C 11/28 |
| 2018/0111682 A1 | * | 4/2018 | Kim | B64C 39/02 |
| 2018/0170510 A1 | * | 6/2018 | Brock | B64C 1/063 |
| 2018/0201356 A1 | * | 7/2018 | Cai | B64C 1/00 |
| 2018/0257769 A1 | * | 9/2018 | Goldstein | B64C 27/50 |
| 2018/0327092 A1 | * | 11/2018 | Deng | B64C 25/52 |

FOREIGN PATENT DOCUMENTS

JP   2001059698 A   *  3/2001
WO   WO-2018/229747 A1   *  12/2018

OTHER PUBLICATIONS

Henderson, Luke et al., "Towards Bio-Inspired Structural Design of a 3D Printable, Ballistically Deployable, Multi-Rotor UAV", 2017 IEEE Aerospace Conference, Date of Conference: Mar. 4-11, 2017, Conference Location: Big Sky, MT, USA, Date Added to IEEE Xplore: Jun. 8, 2017, 7 pages. (Year: 2017).*

EPO machine translation of FR 2846079 (original FR document published Apr. 23, 2004) (Year: 2004).*

* cited by examiner

UNMANNED AERIAL VEHICLE

The present invention generally relates to an unmanned aerial vehicle (UAV).

BACKGROUND OF INVENTION

Modern warfare often involves operatives working in close confines with civilians, civilian targets and friendly personnel. As stray engagements often have very serious consequences, including civilian casualties and/or collateral damage, it is desirable only to engage with enemy targets and personnel.

In modern warfare, it is well recognised that an effort is usually made to concentrate the greatest number of munitions on to a desired target, and any improvements in the probability of the munitions engaging with that target are readily sought. Present day munitions, in particular small arms grenade munitions, have a significant drawback where in order to accurately reach the target, operatives generally require a direct line of sight. Further, operatives must estimate the parabolic trajectory, allowing for differences in distance, altitude, atmospheric conditions, the velocity of the projectile, and other factors. This makes it difficult for operatives to survey or defeat enemy targets in defilade positions or behind cover, such as an intervening crest of a hill, or behind trees. This often results in grenade munitions being used for suppression allowing operatives to move up on targets and engage with more accurate weapon systems, for example, assault rifles.

Another disadvantage of these munitions is they are generally only capable of following a substantially parabolic trajectory, with the trajectory of the projectile unable to be altered once fired.

It would be desirable to provide a UAV which ameliorates or at least alleviates one or more of the above problems or to provide an alternative.

It would also be desirable to provide a UAV that ameliorates or overcomes one or more disadvantages or inconvenience of known small arms grenade munitions.

A reference herein to a patent document or other matter which is given as prior art is not to be taken as an admission or a suggestion that the document or matter was known or that the information it contains was part of the common general knowledge as at the priority date of any of the claims.

SUMMARY OF INVENTION

According an aspect of the present invention, there is provided an unmanned aerial vehicle (UAV) adapted for transit in and deployment from a projectile casing, comprising: a wing assembly, the wing assembly coupled to the projectile casing, the wing assembly moveable between a closed position and a deployed position; and a propulsion system including at least one rotor disposed on the wing assembly to generate lift, wherein: in the closed position, the wing assembly is substantially integral with the projectile casing and in the deployed position, the wing assembly is extended outwards from the projectile casing.

In one or more embodiments, the wing assembly in the closed position may be substantially integral with the projectile casing to effect aerodynamic flight when the projectile casing is projected into an airborne trajectory. The outer surface of the wing assembly may form part of the projectile casing outer surface in the closed position. Advantageously, this may provide protection for the internal components during storage, transit and ground handling. Additionally, in this particular form of the invention, the wing assembly may also provide part of a substantially uninterrupted aerodynamic surface of the projectile casing.

In one or more embodiments, the wing assembly is coupled to the projectile casing via a hinge. The hinge may include a pin associated with a mounting flange. The hinge may be configured to pivot about an axis transverse to the movement of the wing assembly between the closed position and the deployed position.

In one or more embodiments, the wing assembly may include a spring return means used to bias the wing assembly towards the closed position. The wing assembly may be configured for coupling to the projectile casing so as to maintain a portion of the wing assembly in tension when accelerating along the trajectory. Coupling may be provided by a locking ring, thin frangible synthetic plastic membrane, resilient retention clips, friction, or the like. Advantageously, providing a mechanism for returning the wing assembly towards the closed position may eliminate the wing assembly from opening during transit and ground handling, smooth return travel may also be assured. Additionally or alternatively, the spring return means may be provided by virtue of the resiliency of the material used to form the wing assembly, for example, a resilient thermoplastic material or carbon fibre composite sufficiently flexible to interchange between the closed and deployed positions.

In one or more embodiments, the UAV may further comprise an actuator mechanically connected between the projectile casing and a portion of the wing assembly used to extend the wing assembly towards the deployed position. Advantageously, an actuator may provide a force to urge wing assembly towards the deployed position.

In one or more embodiments, the wing assembly is biased towards the closed position by way of gravity. The wing assembly may be configured to extend to the deployed position after passage through the apogee of the trajectory. Advantageously, biasing the wing assembly by way of gravity may provide an assembly of simplified construction, so that destroying the UAV is cost justified.

In one or more embodiments, the UAV may further comprise an inertial measurement unit (IMU); and a controller, configured to: estimate the UAVs trajectory; and provide signals to an actuation means allowing for movement between the closed position and the deployed position after passage through the apogee of the trajectory. Advantageously, an IMU may provide a more accurate position output indicative of the position of the UAV when accelerating along an axis, and allow for configurable deployment of the wing assembly.

The wing assembly may include one or more arms. The one or more arms of the wing assembly may further comprise a propulsion system including at least one rotor disposed to generate lift. Advantageously, providing one or more arms may provide helicopter, tricopter, and quadcopter, etc. configurations.

In one or more embodiments, the rotor may comprise a plurality of blades mounted to pivot outwardly under centrifugal force as the rotor rotates. Advantageously, in this embodiment, the blades occupy a smaller footprint when in the closed position, this may simplify the design and assembly of the UAV and may further increase room for payloads.

The propulsion system may include a plurality of individually controllable rotors, and by adjustment of the angular velocities of each rotor provide adjustment of lift and torque to support stable flight.

In one or more embodiments, the projectile casing is substantially hollow and has an interior void provided with means to accommodate a payload. The payload may include at least one of an explosive, an incendiary, a smoke charge, an incapacitating agent and an illumination composition. In a particular form of the invention, configurable lethal and nonlethal payloads may be supported. Nonlethal offensive approaches may be activated by applying a shock to enemy targets or by administering an incapacitating agent or tranquilizing gas. Further offensive functions may include, administering electric or acoustic shock, administering clouds of fine graphite or the like over electrical components to disrupt power, and providing electromagnetic pulse (EMP) shockwaves.

In one or more embodiments, the projectile casing may comprise a cartridge removably coupled to the projectile casing. The cartridge may be hollow and have an interior provided with means to accommodate a propelling charge. Providing a removable cartridge may allow for configurable propelling charges, for example, blanks, or high and low velocity charges. Additionally, providing a removable cartridge may allow for hand launching scenarios where an operative does not want to give away their position due to the report of the grenade launcher firing.

In one or more embodiments, the projectile casing is of generally right circular cylindrical shape. The projectile casing diameter may be approximately 40 mm. Advantageously, in this embodiment, the projectile casing may be loaded as a normal round in a grenade launcher, such as an M203 single-shot 40 mm under-barrel grenade launcher, or launched by hand. Additionally, the UAV may be launched by unspecialised operatives, and may thus reach a target area very quickly without using its own power. The UAV may also be carried in standard webbing, for example 40 mm grenade chest webbing.

According another aspect of the present invention, there is provided a method of launching an unmanned aerial vehicle (UAV) adapted for transit in and deployment from a projectile casing, comprising: providing the UAV as outlined above, in a launch tube; applying pressurized gases to a back end of the UAV, driving the UAV forward in the launch tube into a substantially parabolic trajectory; and transitioning to an autonomous loiter phase of flight after passage through the apogee of the trajectory.

In one or more embodiments, after transitioning to an autonomous loiter phase of flight after passage through the apogee of the trajectory, the UAV may depart from the trajectory. Advantageously, an operative may "break" from the substantially parabolic ballistic trajectory of conventional small arms systems, dynamically allowing for differences in distance, altitude, atmospheric conditions, the velocity of the projectile, and other factors.

In one or more embodiments, an operative may guide the UAV to a target. Advantageously, operatives may selectively engage with targets and identify, for example, soft spots in armour. Operatives may also guide a plurality of UAVs with explosive payloads to targets incrementally.

In one or more embodiments, the launch tube comprises a 40-mm grenade launcher. Advantageously, in this embodiment, the UAV may be loaded as a normal round in a grenade launcher, such as an M203 single-shot 40 mm under-barrel grenade launcher.

According to another aspect of the present invention, there is provided a target guidance system comprising a lunch tube, two or more unmanned aerial vehicles (UAVs) each adapted for transit in and deployment from a projectile casing, and a controller configured to communicate between two or more UAVs.

In one or more embodiments, the controller is capable of relaying spatial and temporal data between two or more UAVs. This may include communicating with a nearby UAV to determine which one moves or whether both should move to avoid a collision via a mesh network, or the like.

In one or more embodiments, two or more UAVs are configured with a swarming feature which aggregates two or more UAVs together autonomously or by manual input from an operator by a ground station to the target. Advantageously, swarming may be used to overwhelm or saturate the defences of the target.

Two or more UAVs are further configured to steer in a space over a target in a cooperative swarm. Such cooperative swarm functions are advantaged as operatives have the ability to stop the offensive functions, unlike traditional guided munitions or grenades which operate continuously. This feature allows an operative to change direction and take time to engage with targets particularly dynamic targets. Moreover, the constant changes in the modern battlefield, particularly where operatives are working in close confines with civilians, civilian targets and friendly personnel, providing a continuously adaptation provides a further advantage.

BRIEF DESCRIPTION OF DRAWINGS

The invention will now be described in further detail by reference to the accompanying drawings. It is to be understood that the particularity of the drawings does not superseded the generality of the preceding description of the invention.

DETAILED DESCRIPTION

The invention is suitable for deployment from a projectile casing and launched by a grenade launcher, and it will be convenient to describe the invention in relation to that exemplary, but non-limiting, application.

Figure 1:
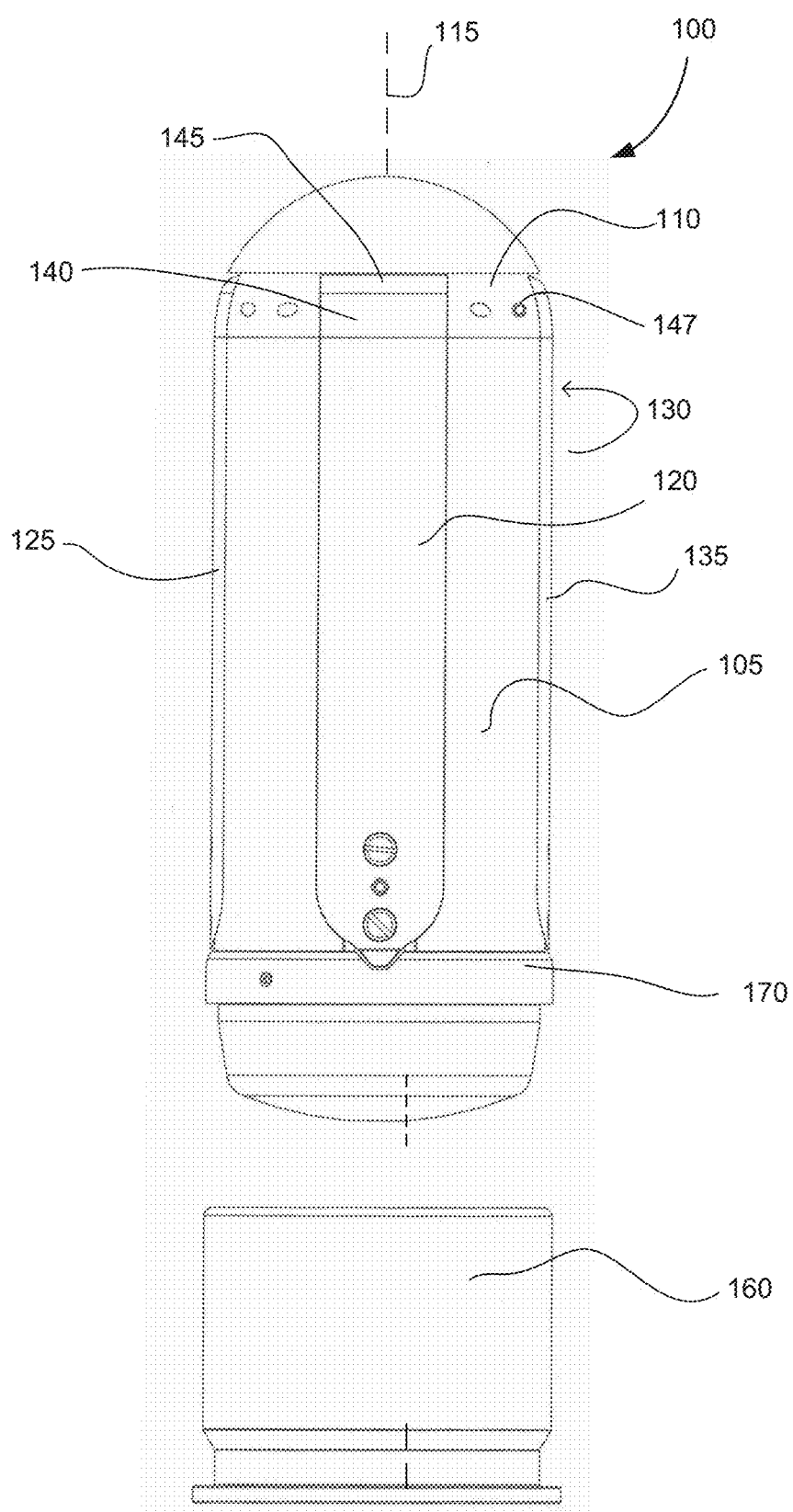
FIG. 1 shows a UAV in a closed configuration.

Referring firstly to FIG. 1, there is shown a side view of an exemplary embodiment of a UAV 100 in a closed position. The UAV 100 includes a projectile casing 105 and a wing assembly 110, mechanically connected as shown, with a removable cartridge 160, shown as removed from UAV 100. In the closed position, wing assembly 110 is substantially integral with projectile casing 105 to effect aerodynamic flight along axis 115 when the UAV 100 is thrown or projected into a trajectory.

According to the embodiment shown, wing assembly 110 may comprise four rotor arms: a first rotor arm 120; a second rotor arm 125; a third rotor arm 130; and, a fourth rotor arm 135. Wing assembly 110 is mechanically connected to projectile casing 105 via a hinge 140 and a mounting flange 145 pivotally connected to the top of each of four rotor arms 120, 125, 130 and 135 via a pin 147 or other similar retention means. Here, gravity biases rotor arms 120, 125, 130 and 135 towards the closed position. In another embodiment, rotor arms 120, 125, 130 and 135, may be attached to the side, or bottom of projectile casing 105, where a dual torsion spring return means in the form of a coiled helical torsion spring, or similar may be used to bias rotor arms 120, 125, 130 and 135 towards the closed and/or the deployed position. It will be appreciated that the spring return means may be provided by virtue of the resiliency of the material used to form the rotor arm, for example, a resilient thermoplastic material or carbon fibre composite sufficiently flexible to interchange between the closed and deployed positions. However, it will also be appreciated that additional or alternative biasing mechanisms may be employed, such as a microelectronic actuator arranged within projectile casing 105. The microelectronic actuator may provide a force applied by a shaft member, by way of a rotatable drive screw, arranged within projectile casing 105 so as to extend in an axial direction out from projectile casing 105 to urge wing assembly 110 towards the deployed position.

Additionally or alternatively, a locking ring 170 may retain wing assembly 110 towards the closed position. In one embodiment, the locking ring 170 is provided by a segmentally annular ring selectively encircling the projectile casing 105 and each of the four rotor arms 120, 125, 130 and 135. The locking ring 170 may be swivel fit to the projectile casing 105 and retained by a rib receivable in a groove on an outer portion of the projectile casing 105. However, it will be appreciated that the provision of such a swivel fitting may be threadably engaged with the projectile casing 105, or the like, and those skilled in the art will recognize suitable designs for providing the stated functions. The locking ring 170 is preferably formed of a ridged material capable of retaining the rotor arms 120, 125, 130 and 135 in association with the projectile casing against the substantial pressures involved in a launch from a launching tube. After the launch, the locking ring 170 may be actuated by a microelectronic actuator arranged within projectile casing 105 during flight. However, in other embodiments, for example before a hand launch, it may be desirable to actuate the locking ring 170 by hand by twisting it, or the like. The locking ring 170 may further include a projection on the ring that, for example, engages and closes an electronic switch connected by suitable electrical conductors to a power supply, which ultimately powers the UAV 100.

In one or more embodiments, the locking ring 170 is provided by an annular ring selectively encircling the projectile casing 105 and each of the four rotor arms 120, 125, 130 and 135. Here, the locking ring 170 is a spring-loaded retractable locking ring slidably mounted on the projectile casing 105. The locking ring 170 is biased to a reference position on the projectile casing 105 where it encircles each of the four rotor arms 120, 125, 130 and 135 in its closed position and is retractable to a portion beyond the rotor arm ends in its open position. The projectile casing 105 may be provided with flanges that are spaced below the arm ends to function as a stop for the locking ring 170 to limit its downward travel. Similarly, the projectile casing 105 may be provided with flanges that are spaced above the arm ends to function as a stop for the locking ring 170 to limit its upward travel, and those skilled in the art will recognize suitable designs for providing the stated functions, for example, semi-circular mating flange segments formed in the projectile casing 105. The locking ring 170 may also be provided with an additional spring compressed to exert a strong biasing force on the locking ring 170 to normally maintain the locking ring 170 in its open position. In this respect, in order to keep the rotor arms 120, 125, 130 and 135 towards the closed position the additional spring may be held in its cocked or inoperative state by means of a fusible alloy, at least until such time that an increase in the ambient temperature causes the fusible alloy to melt and release the locking ring 170, which in turn effects snap-action release of the rotor arms 120, 125, 130 and 135 in unison to simultaneously urge the wing assembly 110 towards the deployed position. This arrangement is advantaged in that it does not require a microelectronic actuator.

The wing assembly 110 and projectile casing 105 may also be covered in a thin frangible synthetic plastic membrane or other suitable material(s) (not shown) to provide both a mechanical seal (protection for the internal components during storage, transit and ground handling) and additionally or alternatively bias rotor arms 120, 125, 130 and 135 towards the closed position. The membrane is fragile enough to crack or break by hand, or with engagement with rifling in a launching tube. The membrane may thus be prepared from and any suitable material having a yield to break point under such forces. However, it will also be appreciated that additional or alternative methods of coupling wing assembly 110 to projectile casing 105 can be used, such as those, but not limited to including, resilient retention clips, or friction, so as to maintain a portion of the wing assembly 110 in tension when accelerating along the axis 115.

The UAV 100 can be loaded as a normal round in a grenade launcher, such as an M203 single-shot 40 mm under-barrel grenade launcher, or launched by hand. Advantageously, in this embodiment, UAV 100 can be launched by unspecialised operatives, and can thus reach a target area very quickly without using its own power. The UAV 100 may also be carried in standard webbing, for example 40 mm grenade chest webbing. However, it will also be appreciated that additional launch systems can be used, such as those, but not limited to including hand launching, pneumatic systems, flare and chaff dispensers, mortars, artillery cannons, submarine signal launch tubes, deployed from aircraft, the like, or a combination of these systems, which may be particularly suitable for larger UAVs. It is to be understood that the projectile casing 105 may have any suitable diameter.

The UAV 100 is designed to withstand severe shock and deployment environments. When viewed from the side, the projectile casing 105 (incorporating the wing assembly 110 in the closed position) is of a largely conventional from factor, and those skilled in the art will recognize suitable designs for providing the stated functions, for example: a substantially hollow, one-piece aluminium body with driving bands and bore riders, coupled to a substantially ogive-shaped nose cone. It will also be understood by those skilled in the art that wing assembly 110 and/or rotor arms 120, 125, 130 and 135 may alternatively be made from any other suitable material (e.g. plastics, other metals and composites).

Figure 2:
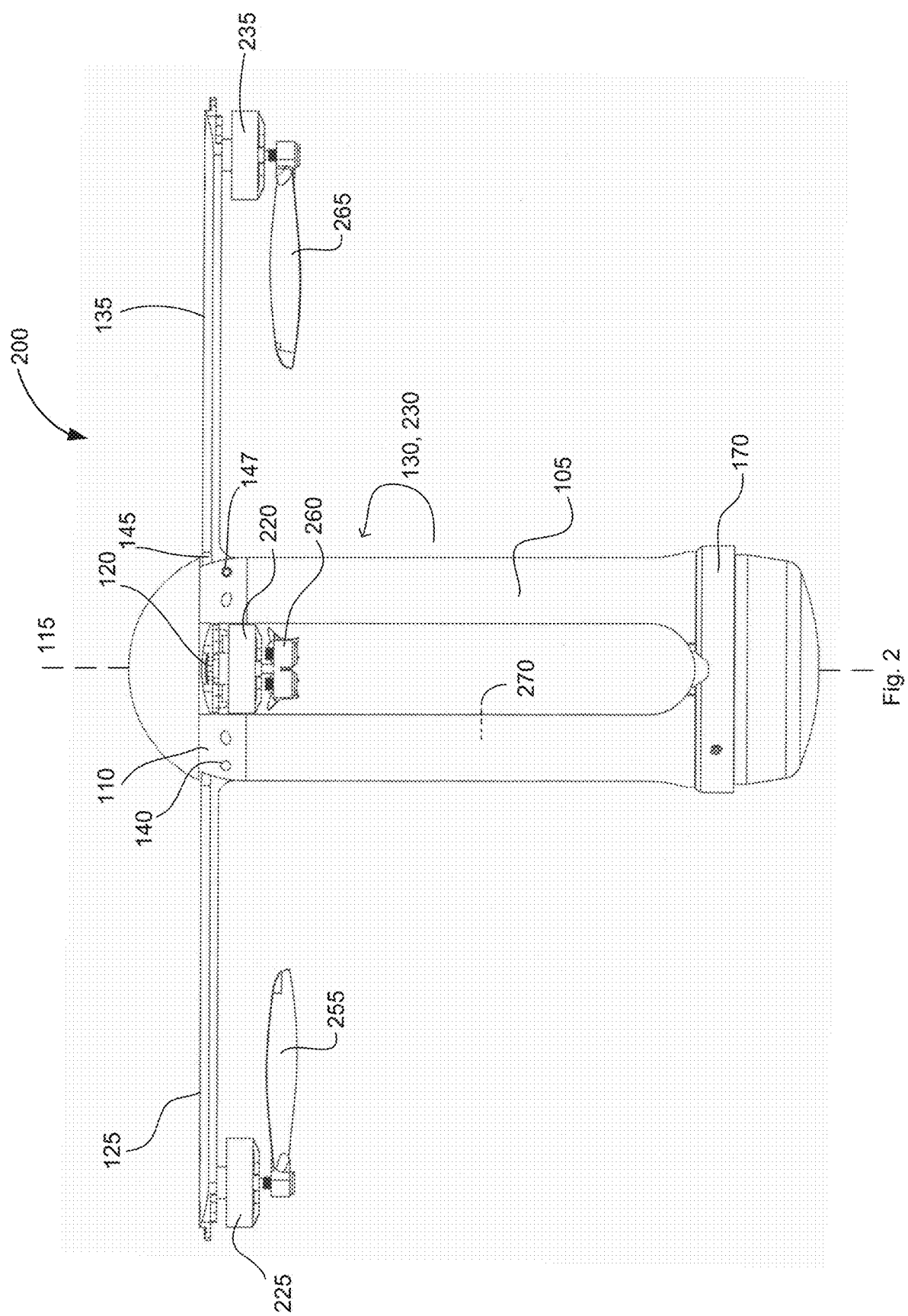
FIG. 2 shows a UAV in a deployed configuration, in which the wing assembly is in an extended state.

Referring now to FIG. 2, there is shown a side view of the exemplary embodiment of FIG. 1. However, the wing assembly 110 is in an extended position with hinge 140 shown to pivot about an axis transverse to the movement of the wing assembly 110 between the closed position and the deployed position. Each of the first rotor arm 120, the second rotor arm 125, the third rotor arm 130, and the fourth rotor arm 135 may be implemented with a first rotor 220, a second rotor 225, a third rotor 230, and a fourth rotor 235, respectively contributing to the propulsion system. A UAV provided with four rotors, such as UAV 200 shown and described herein, may be referred to as a quadcopter. Although it is to be understood that within the scope of this disclosure UAV 200 may comprise any number of rotor arms and any number of blades. The UAV 200 may therefore be a helicopter, tricopter, a quadcopter, etc. Furthermore, in other embodiments the rotor arms need not be symmetrically positioned relative to projectile casing 105, and the propellers need not be symmetrically distributed on the rotor arms. The rotors, which may be commercially available off the shelf (COTS) components or the like, are mounted such that the rotor shaft can support a plurality of blades. The propulsion system for providing lift and consequently aerial movement of the UAV may be provided by known propulsion means, such as electric motors with a rotor.

Airborne motion of the UAV 200 may be controlled by rotation of rotor blades 250, 255, 250, and 255 and by adjustment of the angular velocities of each rotor by known methods to provide adjustment of lift and torque to support stable flight of UAV 200, generally, via feedback from an inertial measurement unit (IMU) and an altimeter module.

According to the embodiment shown, rotors 220, 225, 230 and 235 include a pair of blades 250, 255, 260 and 265 mounted to pivot outwardly under centrifugal force as the rotor rotates. Advantageously, in this embodiment, the blades occupy a smaller footprint when in the closed position, thereby simplifying the design and assembly of UAV 200 and further increases room for payloads, as is best shown with reference to FIG. 3, particularly blade pair 260. Furthermore, blade pairs 250, 255, 260, and 265, when in the overlapping state as shown, do not intervene with projectile casing 105 during transition between the closed and deployed positions. However, it will be appreciated that intervening blade pairs may provide an advantage when in transit, whereby the rotor arms may be contained in part by the blades against an inner surface 270 of projectile casing 105.

The blade pairs 250, 255, 260, and 265, when deployed, are arranged in a substantially rectangular configuration about the centre of projectile casing 105 and centre of mass. In a particular embodiment, for example, the distance between the axis of rotation of opposing blade pairs 255 and 265 may be about 180 millimetres (mm). Here, blade pairs 250, 255, 260, and 265 are seen to rotate in a common plane below rotor arms 120, 125, 130 and 135 to generate thrust in an upwards direction. Advantageously, as well as providing lift for UAV 200, this also forces wing assembly 110 towards the deployed position such that deployment configurations without a mechanical biasing means are possible, for example, when UAV 200 is held upside down, or reaches apogee where it starts its downward descent along a projected path. The UAV 200 may start its downward descent after the propulsive force from, for example, a grenade launcher is terminated and UAV 200 is acted upon only by gravity and aerodynamic drag. The remaining elements shown in FIG. 2 are identical to FIG. 1 and so share the same references.

Figure 3:
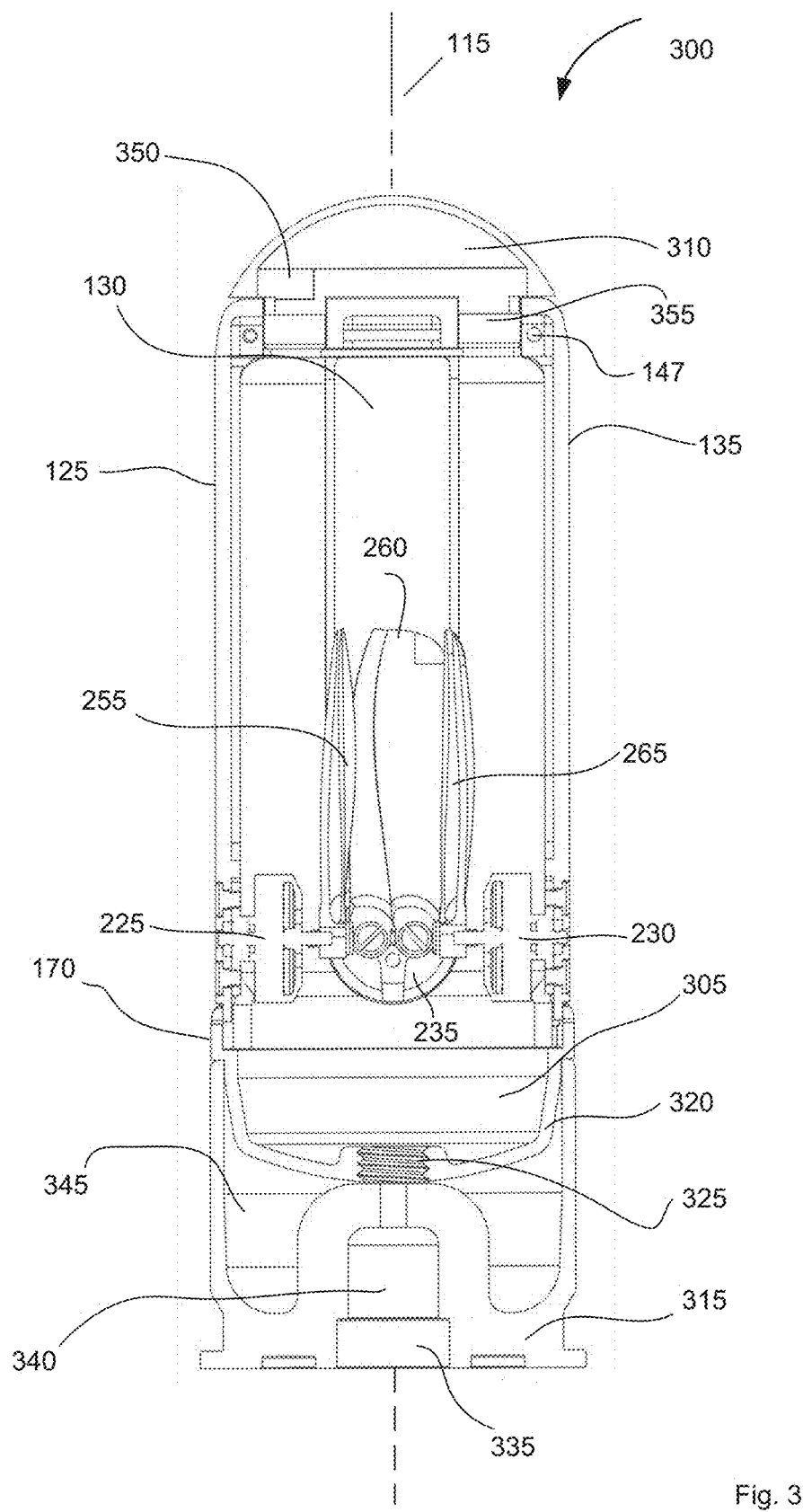
FIG. 3 shows a section through the UAV in a closed configuration, in which a payload is shown.

Referring now to FIG. 3, there is shown a section through the UAV 300 of the exemplary embodiment of FIG. 1, in which payload voids 305 and 310 are shown. UAV 300 also includes a removable cartridge 315, mechanically connected as shown with the bottom of projectile casing 320 via an intermediate screw 325, according to one embodiment. According to another embodiment, projectile casing 320 is press fit into cartridge 315, or maintained by threaded engagement in the bottom of the projectile casing 320 periphery itself, such that it is removable by an operative wanting to hand launch the UAV 300 (e.g., without a grenade launcher). Advantageously, in this embodiment, UAV 300 can be launched several times by refitting a new cartridge 315 to the bottom of projectile casing 320. Providing a removable cartridge 315 also allows for configurable propelling charges, for example, blanks, or high and low velocity charges. Additionally, providing removable cartridge 315 allows for hand launching scenarios where the operative does not want to give away their position due to the report of the grenade launcher firing.

The cartridge 315 is a substantially hollow two-chambered 340 and 345 cylinder incorporating a primer 335. The propellant cup 340 is sealed by the primer 335, and contains a propelling charge (not shown). The propellant cup 340 acts as a high-pressure chamber, and the hollow cavity 345 in the cartridge 315 surrounding the cup 340 acts as a low-pressure chamber. As should be evident to those skilled in the art, this is typical of internal pressure chambers for high-low pressure systems including those employed by the M118 cartridge case as part of commonly used small arms grenade munitions.

In one or more embodiments, the bottom payload void 305 includes an explosive designed to inflict personnel casualties from a selectable air, ground or delayed burst effect, via an electronic fusing system, resulting in blast and fragmentation of the projectile casing 320. Additionally or alternatively, the bottom payload void 305 may include a shaped explosive charge. It will be appreciated that the shaped explosive charge may further include the provision of a metal liner in the payload void 305, formed of a dense, ductile metal, such as copper. Other materials may also be employed, for example, molybdenum and pseudo-alloys of tungsten filler and copper binder. The metal-liner may be a hollow conical shape, with an internal apex angle of around 40 to 90 degrees. Other shapes may also be employed, for example, a hemisphere, tulip, trumpet, ellipse, bi-conic, and the like, which may be particularly suitable for not intervening with the blade pairs 250, 255, 260 and 265. As explosive energy is released normal to the surface of the explosive, shaping the explosive concentrates the explosive energy in the payload void 305. Here, the enormous pressure generated by the detonation of the explosive drives the liner in the payload void 305 inward to collapse upon its central axis. Under ordinary practice this causes the formation and projection of a very high-velocity jet of metal particles forward along the axis. Advantageously, the high-velocity jet of metal particles may penetrate armour plating on vehicles or other protected structures from a significant standoff distance.

However, it will also be appreciated that additional or alternative payloads can be used, such as those, but not limited to including, incendiaries, smoke charges, incapacitating agents (e.g. CS gas), illumination compositions, the like, or a combination of these payloads. The top payload 310 is an electronic payload and includes at least one inertial measurement unit (IMU) that provides acceleration data and/or angular velocity data, and an altimeter module that provides altitude data of the UAV 300 to support stable flight, as discussed with reference to FIG. 2. The IMU and altimeter module is shown as a printed circuit board (PCB) assembly 350. The PCB may further include other components, such as a global positioning system (GPS) module, a power supply, a signal processor, or ASIC, feedback electronics to resolve the position of the rotor arms in flight, a communication module and an autopilot module. Preferably, the feedback system uses a mechanical switch or encoder to determine the position of each rotor arm. It should be appreciated that control circuitry may be employed for receiving the acceleration data and/or angular velocity data, to also provide a position output indicative of the position of UAV 300 when accelerating along axis 115. The control circuitry may employ a microcontroller or other circuitry for continuously monitoring the position of UAV 300 and controlling activation and deactivation of rotors 220, 225, 230 and 235 by known methods. It will be appreciated that the control circuitry may independently control the UAV 300 to execute a flight scenario without ongoing control from the operative.

In one or more embodiments, IMU 350 is operatively coupled to rotors 220 (not shown), 225, 230 and 235 and configured to transition to an autonomous phase of flight after passage through apogee on a substantially parabolic trajectory. In an alternative embodiment, an operative can manually configure UAV 300 to an autonomous phase of flight via a mechanical switch, for example, as part of locking ring 170, as discussed with reference to FIG. 1. The mechanical switch may also be provided to turn UAV 300 off so as to conserve power when not in use. It should be appreciated that other switches may be employed to activate the autonomous phase of flight, such as, but not limited to, altitude switches, magnetic switches, toggle switches, and pressure sensitive switches.

IMUs are prone to transient saturation, this may occur when, for example, an accelerometer or gyroscope experiences a large, high-frequency, input acceleration or rotation beyond its dynamic operating range, as may be the case during a grenade launch which typically relies on spin stabilisation to provide increased accuracy during launch. In such cases, the control circuit's amplification can saturate and cause signal distortions, which may unduly delay deployment of rotor arms 120 (not shown), 125, 130 and 135 when passing through apogee, as an accurate position output indicative of the position of UAV 300 when accelerating along axis 115 will not be acquired. In other embodiments, particularly those embodiments that do not rely on a mechanical biasing means for the wing assembly, as the spin imparted on the UAV is directed away from the axis of rotation, the rotor arms may be forced outward, prematurely disrupting aerodynamic flight before passage through the apogee.

It is therefore desirable that a means for reducing the imparted spin on the UAV 300 is provided. In one embodiment, projectile casing 320 may be provided with a free rotating portion that engages the rifling in the grenade launcher tube imparting spin on the free rotating portion, thereby reducing spin on the IMU. In another embodiment, projectile casing 320 may be provided with a free rotating flared base that engages the rifling in the grenade launcher imparting spin on only the flared base. Other means of reducing spin are well known to those in the art, such as, for example fins and slipping obturators.

IMUs are also sensitive to vibration, for example, when exposed to rotor vibrations and sudden altitude changes, as may be the case during a grenade launch. Excessive vibrations compromise the IMUs ability to support stable flight, leading to poor performance, particularly in modes that rely on accurate positioning (e.g. guided or loitering modes), but also may unduly delay deployment of rotor arms 120 (not shown), 125, 130 and 135 when passing through apogee, as an accurate position output indicative of the position of UAV 300 when accelerating along axis 115 will not be acquired. To mitigate the effects of vibration, the top payload 310 may include two IMUs: a first IMU that provides acceleration data and/or angular velocity data of the UAV 300 to support stable flight, as discussed with reference to FIG. 2; and, a second IMU that provides baseline rotor vibration data. Control circuitry, which may employ a microcontroller and firmware or other circuitry, continuously monitors data from both IMUs where a filter is employed to subtract the baseline rotor vibration data from the acceleration data and/or angular velocity data pertaining to the UAV 300 itself. However, it should also be appreciated that additional or alternative filtering methods can be used, such as those, but not limited to including, extended Kalman filters, evenly weighted moving average filters, the like, or a combination of these filters, which may be particularly suitable for implementation in firmware. Mechanical isolation of the rotors or sensitive components, including the IMUs, may also be provided, including resilient suspension means, or gel pads formed of slow response silicone or urethane foam, or the like.

In one or more embodiments, the top payload 310 includes an optical sensor, which may be IR or visible range, to survey an area of interest, and communicate the images back to an operative. The communication module, which is preferably a 900 MHz COTS module, may be any wireless communication such as, for example, a software-defined radio module, to enable data transfer to the operative or between numerous UAVs. The data may be encrypted or unencrypted. Although it is to be understood that within the scope of this disclosure top payload 310 may comprise an explosive and bottom payload 305 may comprise, for example, the IMU and control circuitry.

The communications module may have one or more internal or external antennas for enabling data transfer such as radio frequency signals. In one embodiment, the antenna (s) may be patch antenna(s) arranged in rotor arms 120 (not shown), 125, 130 and 135. In another embodiment, the antenna may be a simple dipole antenna with a radiation pattern in a desired alignment with ground operatives.

In one or more embodiments, the top payload 310 includes an infrared illumination module (or beacon), to provide illumination of a target for infrared seeking missiles, or to act as a decoy. As is known in the art, military vehicles may be provided with decoys which are used to draw various types of guided weapons away from the vehicles. In this respect, the UAV 300 is adapted to attract infrared or heat seeking guided missiles away from the deploying vehicle (i.e., the target). Advantageously, this may give the appearance of a moving infrared target in the airspace in which the UAV 300 has been released and present a more attractive thermal target than the vehicle from which it is deployed, thus decoying the weapon away from the vehicle. The remaining elements shown in FIG. 3 are identical to FIG. 2 and so share the same references.

Figure 4:
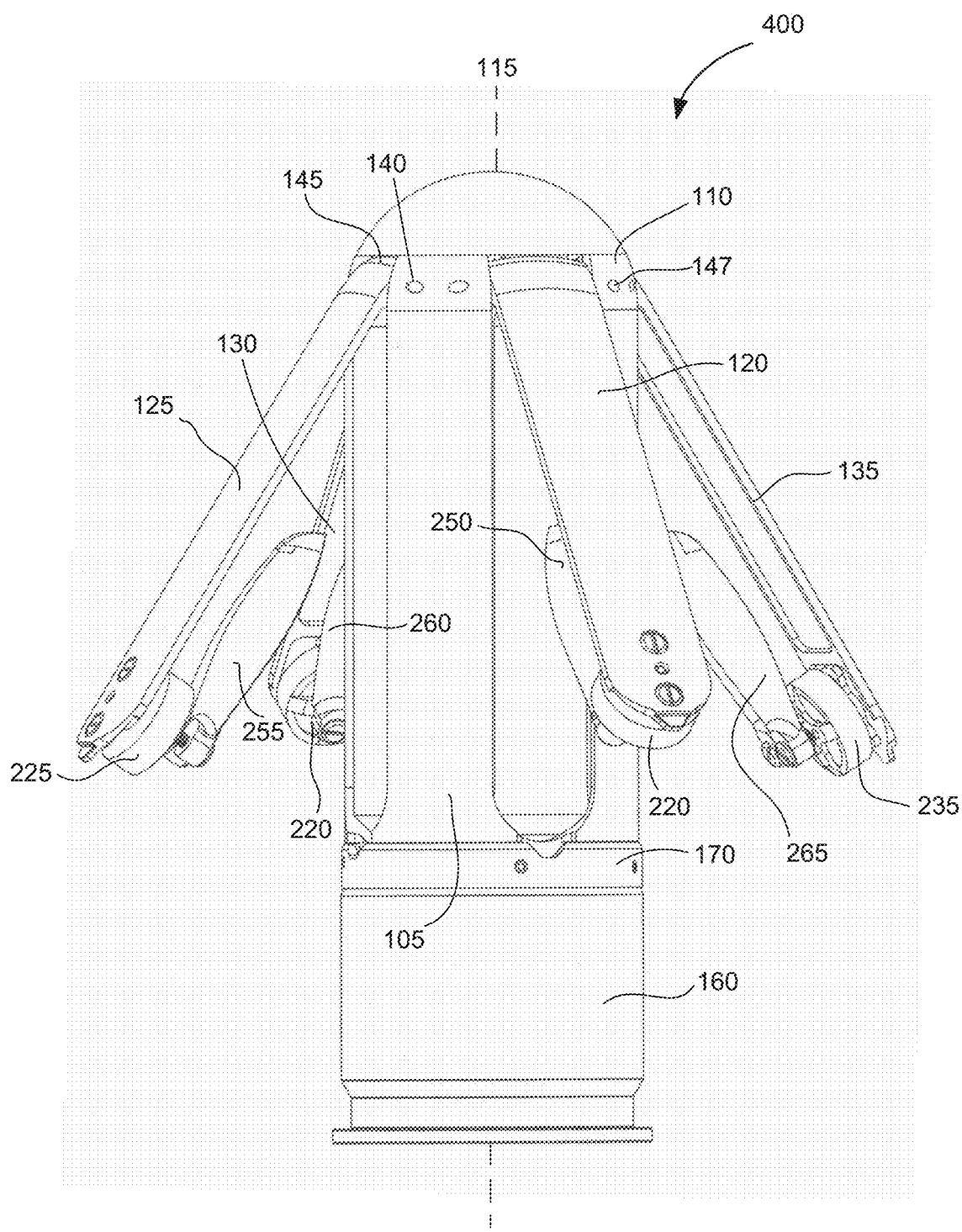
FIG. 4 shows a UAV midway through a deployed configuration, in which the wing assembly is approaching an extended state.

Referring now to FIG. 4, there is shown a partial deployment of the UAV 400 adapted according to an exemplary embodiment of the invention. Each of the rotor arms 120, 125, 130 and 135 are deployed simultaneously. The elements shown in FIG. 4 are identical to FIG. 2 and so share the same references.

The present invention provides a number of advantages and improvements over prior art approaches to projectiles. More particularly, the projectile provides a UAV that can be loaded as a normal round in a grenade launcher by unspecialized operatives, and can thus reach a target area very quickly without using its own power during launch. Therefore, operatives may have more flexibility when engaging with enemy targets and personnel. Moreover, an operative may "break" from the substantially parabolic ballistic trajectory of conventional small arms systems, dynamically allowing for differences in distance, altitude, atmospheric conditions, the velocity of the projectile, and other factors. Operatives may also selectively engage with targets and identify, for example, soft spots in armour. Operatives may also guide a plurality of UAVs with explosive payloads to targets incrementally. As is known in the art, the synergetic effect of blast waves and fragmentation of munitions deployed in this way is larger than the arithmetic sum of the effect of separate blast waves and fragmentation. Further, operatives may be able to survey or defeat enemy targets in defilade positions or behind cover, allowing sufficient time for the operative to verify that a target is an enemy target, or select an air, ground or delayed burst effect, via an electronic fusing system to best engage with said target. Finally, it is a distinct advance of the projectile that IMU saturation may be reduced.

Figure 5:
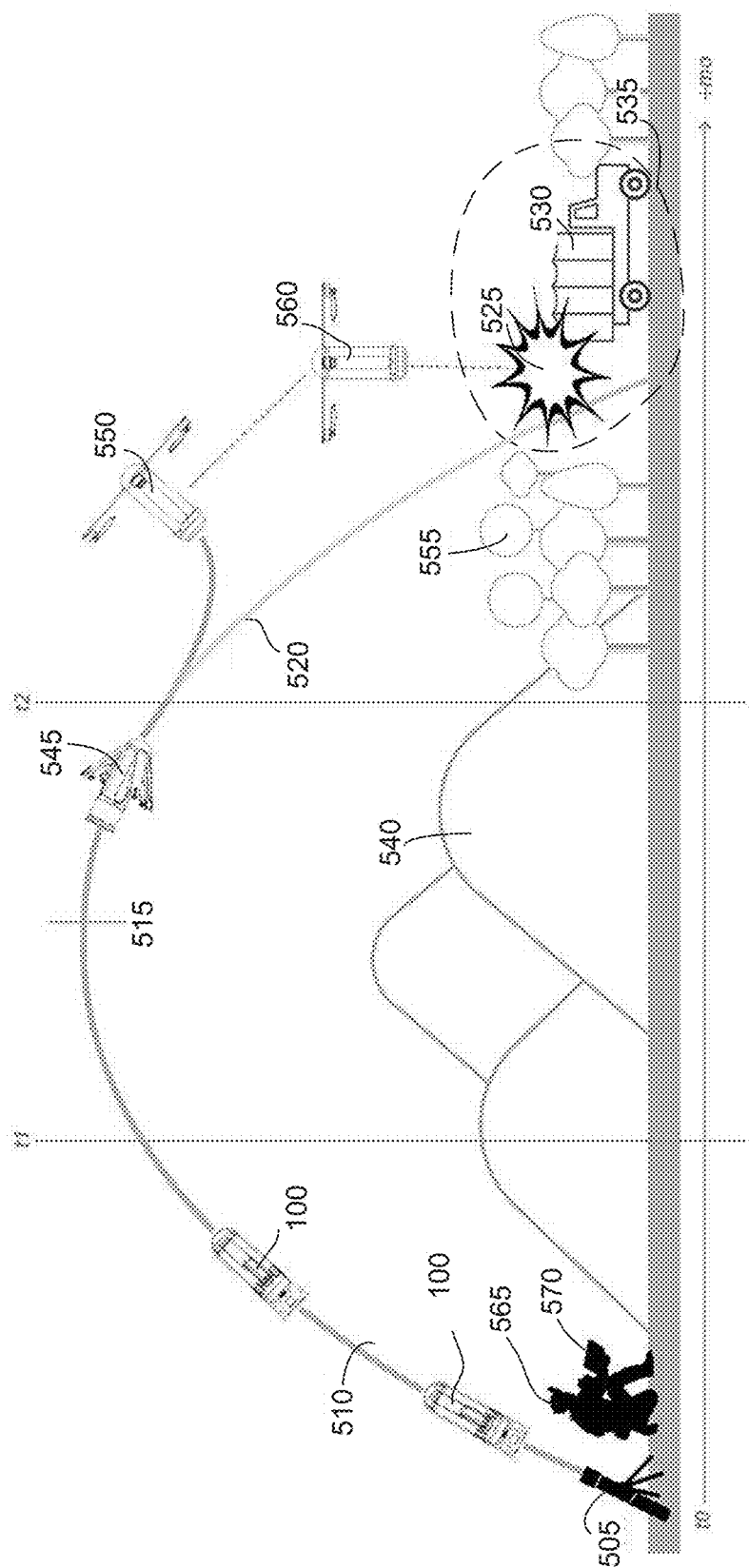
FIG. 5 shows a flight scenario of a UAV adapted according to an exemplary embodiment of the invention.

Referring now to FIG. 5, there is shown a flight scenario of UAV 100 launched from a grenade launcher 505, by an operative 565 at time zero to according to an exemplary embodiment of the present invention. UAV 100 is launched in a substantially parabolic ballistic trajectory 510 over an intervening hill 540 at a target 530. The target is a truck taking cover behind trees 555, and in a general target area 535. General target area 535 may be considered an effective kill zone radius.

In the absence of forward observer personnel, reconnaissance patrols, or a GPS coordinate for target 530, which may provide distance and bearing information over intervening hill 540, operative 565 does not have means to provide distance and bearing information as there is no direct line of sight. Accordingly, operative 565 must estimate the distance between target area 535 and set bearing information. The "best guess" distance and bearing information are used to launch UAV 100 at time zero $t_0$. Here, operative 565 does not know whether UAV 100 will accurately reach target area 535.

After the launch, UAV 100 travels along trajectory 510 in the closed state, as best shown with reference to FIG. 1. In one or more embodiments, when UAV 100 reaches apogee 515 and starts a downward descent along trajectory 510, UAV 100 moves between the closed position and the deployed position, as is best shown with reference to 545 and with further reference to FIG. 2. Here, UAV 100 is acted upon only by gravity and aerodynamic drag. When UAV 100 is in the deployed position after passage through apogee 515 of trajectory 510, feedback electronics resolve the position of rotor arms 120, 125, 130 and 135 and the rotors disposed on the rotor arms generate lift. However, it will be appreciated that in embodiments where spring biasing means are employed to effect snap-action release of the rotor arms 120, 125, 130 and 135, feedback electronics to resolve the position of the rotor arms may not be required as starting the rotors and releasing the rotor arms may occur simultaneously due to the speed of the action. As can be appreciated UAV 100 may now depart from substantially parabolic ballistic trajectory 510 before reaching point 520, for example.

In one or more embodiments, an IMU and a microcontroller, configured to estimate UAV 100 trajectory 510 (e.g., based on altitude, velocity and GPS) may be employed to determine when UAV 100 is approaching apogee 515 at $t_1$ and when UAV 100 has passed through apogee 515 at $t_2$, for example, by known methods. The IMU and microcontroller may be further configured to provide a signal to a microelectronic actuator used to urge wing assembly 110 towards the deployed position, as discussed with reference to FIG. 2.

When UAV 100 is in the deployed position, as above, feedback electronics may resolve the position of rotor arms 120, 125, 130 and 135 and the rotors disposed on the rotor arms may receive a signal from the microcontroller to rotate and generate lift. As can be appreciated, UAV 100 may now also depart from substantially parabolic ballistic trajectory 510 before reaching point 520, for example. In another embodiment, the deployment of rotor arms 120, 125, 130 and 135 may be determined by a timer delay or peak altitude.

After departing from substantially parabolic trajectory 510, the IMU provides acceleration data and/or angular velocity data of UAV 100 to support stable flight by known methods, as discussed with reference to FIG. 2. By using a GPS coordinate or a ground station 570 capable of receiving data from an optical sensor included in UAV 100, operative 565 may steer UAV 100 autonomously or by manual input by the ground station 570 to target area 535.

The ground station 570 includes a processor for executing management of UAV 100 and memory coring flight scenarios, as well as a dual path communications module for executing flight scenarios to UAV 100.

In target area 535 operative 565 can validate the target 530 as an enemy target, for example, and/or select the best engagement method for that target. Here, operative 565 has opted to inflict personnel casualties by selecting an air burst effect 525, via an electronic fusing system, resulting in blast and fragmentation of the projectile casing 105, as discussed with reference to FIG. 3. The fusing system accepts engagement commands from the operative via ground station 570. Further, to ensure safe operation and reduction of harm to the operative, the fuse incorporates a redundant microcontroller or other circuitry for continuously monitoring the position, independently those used to support stable flight, so as to prevent mishaps.

In one or more embodiments, after departing from substantially parabolic trajectory 510, the rotors disposed on the rotor arms may receive a signal from the microcontroller, or via manual input by the ground station 570, to reverse the rotation direction of the rotors. Being able to reverse each rotor individually gives the UAV 100 the ability to fly inverted, for specialised manoeuvres, or to flip over should it land upside down. Having the ability to fly inverted also provides an engagement method whereby the UAV 100 may be accelerated downwards towards the target. As can be appreciated, the acceleration of the UAV 100 is directly proportional to the force that will ultimately act on the target. To maximise the acceleration, the rotors may be driven beyond their maximum operating limits for a permissible period of operation before destruction by overheating of windings, for example, or other damage associated with the blast and fragmentation of the projectile casing 105, as discussed with reference to FIG. 3.

In another embodiment, the UAV 100 comprises at least one self-destruct means to render inoperative the microcontroller and other circuitry, particularly in embodiments without an explosive payload. The self-destruct may be caused via known means such as the use of a high electrical current passed through the microcontroller and other circuitry applied via a supercapacitor, or sudden battery discharge through it. The self-destruct may be remotely initiated by the operative 565 via ground station 570.

Figure 6:
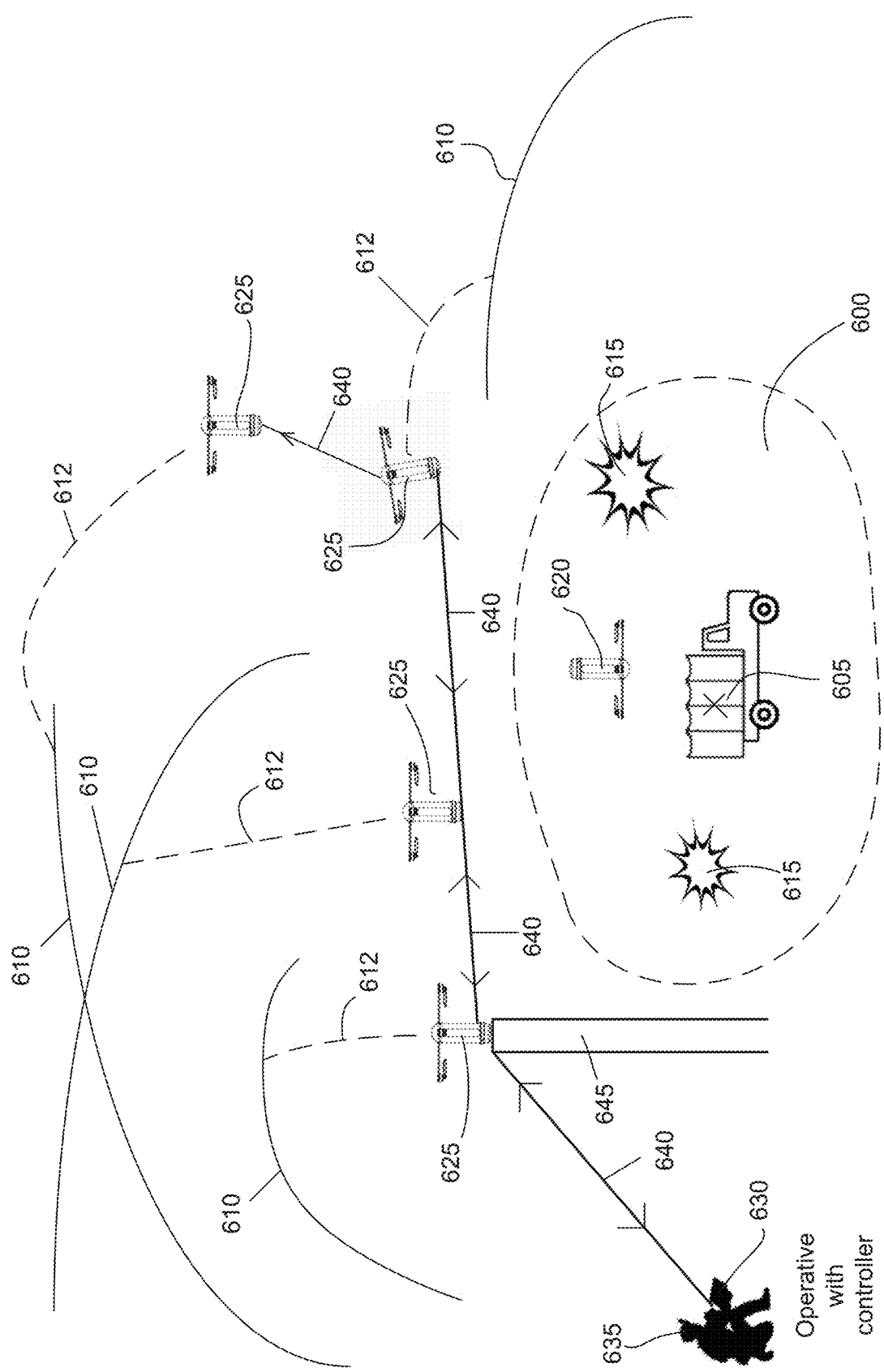
FIG. 6 shows a plurality of UAVs operating in a target area, and a swarming pattern according to an exemplary embodiment of the invention.

Referring now to FIG. 6, there is shown a flight scenario of a target guidance system of four UAVs 625 and one UAV 620, flying inverted, as discussed with reference to FIG. 5. Each of the five UAVs 625 and 620 has been launched by an operative 635 along different substantially parabolic trajectories 610 towards a target 605. The target 605 is an armoured truck, taking cover behind an intervening structure 645 in a general target area 600. General target area 600 may be considered an effective kill zone radius, or simply a monitored area. The target guidance system includes a ground station 630 for executing flight scenarios on the UAVs, which may be set to guide the UAVs to the general target area 600. Each UAV has departed from substantially parabolic trajectories 610 and has entered an autonomous phase of flight to execute the flight scenarios 612. In one embodiment, the UAVs may execute the flight scenario without ongoing control from the operative 635, and this may involve having the UAV loiter or hold its position for a predetermined period of time, or until otherwise instructed by the operative 635 via manual input on ground station 630. For example, the operative 635 may identify a loitering UAV in the group and instruct it to fly inverted towards the target as is shown with reference to UAV 620. Alternatively, the operative 635 may instruct a UAV to return home (RTH), self-destruct, or the like.

When two or more UAVs have been deployed, control circuitry, which may employ a microcontroller or other circuitry (e.g., swarming and/or flocking logic) for continuously monitoring the position of each UAV may also communicate information via the communications module between each UAV, as discussed with reference to FIG. 3. The communicated information may include spatial and temporal information (e.g., GPS and altitude data) such that each UAV is aware of each other UAV in space and time. As will be appreciated, this may include communicating with a nearby UAV to determine which one moves or whether both should move to avoid a collision via a mesh network, or the like. Each UAV may include a unique identifier.

In some applications, such as engaging with an armoured vehicle as described, it is desirable or useful to use two or more UAVs controlled in an organised manner. For example, numerous UAVs may be used to provide surveillance of the general target area 600 or to identify soft spots in armour of the target 605 such as windows. Operatives may also guide numerous UAVs with explosive payloads to targets incrementally in a synchronised or choreographed manner. In such applications, swarming may be used to control the UAVs as they fly over the general target area 600 and approach the target 605. In this context, a swarm may be thought of as a self-organising network of UAVs in which each UAV is aware of each other's movements such that they aggregate together or move en masse towards the target.

In one or more embodiments, swarming is used to overwhelm or saturate the defences of the target 605. Here, each of the five UAVs 625 and 620 autonomously attack the target 605 from the front and the rear of the target 605 with airbursts 615 (e.g. two simultaneous airburst effects). However, it will be appreciated by those skilled in the art that other engagement routines are possible, including surrounding the target, even as the target remains mobile.

The network of UAVs can also be used as a communication interface as illustrated by air interface 640. Available radio resources, for example bandwidth, may be limited in the battlefield, and it may be necessary for the UAVs to behave as repeaters. In this case, operative 635 may instruct a UAV to perch on an intervening structure which has caused an information-bearing signal to degrade. The perched UAV may increase the power of signals and retransmit them allowing them to travel further or, in this case over obstructions. Examples of such communications include surveillance information and UAV monitoring information. In this way, long-range communications can be realised without having to build large direct communications systems and without having to rely on expensive satellite bandwidth.

In another embodiment, the UAV, for instance, during reconnaissance, may identify an access point into a vehicle. Nonlethal offensive approaches may be activated by applying a shock to enemy targets or by administering an incapacitating agent or tranquilizing gas. It will be appreciated by those skilled in the art that swarms may also be used in this nonlethal context by continuously administering an incapacitating agent through the window in a choreographed manner, whereby upon depletion of one UAV another UAV fills its place. A similar approach may be used to provide a smoke cover.

Further offensive swarm functions may include clearing improvised explosive devices or mines, administering electric or acoustic shock, administering clouds of fine graphite or the like over electrical components to disrupt power, and providing electromagnetic pulse (EMP) shockwaves. Such swarm functions are advantaged as operatives have the ability to stop the offensive functions, unlike traditional guided munitions or grenades which operate continuously. This feature allows an operative to change direction and take time to engage with targets particularly dynamic targets, including other UAVs. Moreover, the constant changes in the modern battlefield, particularly where operatives are working in close confines with civilians, civilian targets and friendly personnel, providing a continuously adaptation provides an ideal weapons system.

While in the above example five UAVs have been used to engage with target 605, it will be appreciated by those skilled in the art that the swarm may comprise a large group of tens or hundreds of UAVs that are launched from various locations, including aircraft, into a battlefield. The swarm may encounter various targets, with the swarm dividing into numerous smaller groups of UAVs for specific attacks. The groups may regroup to further engage with other targets or lay dormant in the battlefield where they may be reactivated, remotely detonated, or remotely initiated to self-destruct. In this scenario, UAVs can be used as defensive mines to protect mobile personnel and then strike enemy targets as they enter a specific area. This approach of selectively engaging with targets sustains the moral responsibility necessary by not targeting civilians, civilian targets and friendly personnel.

For the purposes of description herein, the terms "side", "top", "bottom", "upside down", "inverted" and derivatives thereof shall be related to the UAV of FIG. 1.

The term "projectile", as used herein, refers to any object projected through a medium (e.g., air). The projection force can be delivered by a mechanism (e.g., a grenade launcher) or can be delivered by a human operative (e.g., by throwing it).

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The present application may be used as a basis or priority in respect of one or more future applications and the claims of any such future application may be directed to any one feature or combination of features that are described in the present application. Any such future application may include one or more of the following claims, which are given by way of example and are non-limiting in regard to what may be claimed in any future application.

The invention claimed is:

1. An unmanned aerial vehicle (UAV) comprising:
   a projectile casing configured to be loaded as a round in and launched from a grenade launcher, the projectile casing comprising a detachable cartridge that comprises a hollow interior configured to accommodate a propelling charge;
   a selectively actuated locking mechanism coupled to the projectile casing;
   a wing assembly, the wing assembly being coupled to and substantially integral with the projectile casing and being selectively moveable upon actuation between a closed position in which the locking mechanism locks the wing assembly against the projectile casing such that an outer surfaces of the wing assembly form part of an outer surface of the projectile casing and a deployed position in which the locking mechanism releases the wing assembly to enable free ends of the wing assembly to deploy away from the projectile casing while other ends of the wing assembly remain coupled to the projectile casing;
   an inertial measurement unit (IMU);
   an altimeter module;
   a microcontroller coupled to the IMU and to the altimeter, the microcontroller being configured to:
      estimate a trajectory of the UAV using the IMU and altimeter; and
      provide signals to act upon the locking mechanism based on the estimated trajectory to cause the UAV to transition from a substantially parabolic ballistic phase of flight after launch in which the wing assembly is the closed position to an autonomous phase of flight after passage through an apogee of the substantially parabolic trajectory in which the wing assembly is in the deployed position;
   a propulsion system comprising at least one rotor, disposed on the wing assembly, to generate lift during the autonomous phase of flight; and
   a payload comprising an explosive at least sufficient to cause fragmentation of the projectile casing when the UAV has reached an intended target after the autonomous phase of flight.

2. The UAV of claim 1, wherein the wing assembly in the closed position is substantially integral with the projectile casing to effect aerodynamic flight when the projectile casing is projected into an airborne trajectory.

3. The UAV of claim 2, wherein the wing assembly is configured for coupling to the projectile casing so as to maintain a portion of the wing assembly in tension when accelerating along the airborne trajectory.

4. The UAV of claim 1, wherein an outer surface of the wing assembly forms part of the projectile casing outer surface in the closed position.

5. The UAV of claim 1, further comprising a hinge configured to couple the wing assembly to the projectile casing.

6. The UAV of claim 5, wherein the hinge is further configured to pivot about an axis transverse to the movement of the wing assembly between the closed position and the deployed position.

7. The UAV of claim 1, wherein the wing assembly further is spring-biased towards the closed position.

8. The UAV of claim 1, wherein the wing assembly is biased towards the closed position by gravity.

9. The UAV of claim 8, wherein the wing assembly is configured to extend to the deployed position after passage through the apogee of the airborne trajectory.

10. The UAV of claim 1, wherein the wing assembly comprises one or more arms.

11. The UAV of claim 10, wherein the one or more arms of the wing assembly further comprises a propulsion system comprising at least one rotor disposed to generate lift.

12. The UAV of claim 11, wherein the rotor comprises a plurality of blades mounted to pivot outwardly under centrifugal force as the rotor rotates.

13. The UAV of claim 10, wherein the propulsion system comprises a plurality of individually controllable rotors and, by adjustment of angular velocities of each of the plurality of individually controllable rotors, provide adjustment of lift and torque to support stable flight of the UAV.

14. The UAV of claim 1, wherein the projectile casing is substantially hollow and has an interior void configured to accommodate the payload.

15. The UAV of claim 14, wherein the payload includes at least one of an incendiary, a smoke charge, an incapacitating agent and an illumination composition.

16. The UAV of claim 1, wherein the projectile casing is of generally right circular cylindrical shape.

17. The UAV of claim 1, wherein the projectile casing diameter is approximately 40-mm.

18. A method, comprising:
   providing an explosive round for a grenade launcher, the explosive round comprising an Unmanned Aerial Vehicle (UAV) comprising a projectile casing, the projectile casing comprising a detachable cartridge that comprises a hollow interior configured to accommodate a propelling charge; a selectively actuated locking mechanism coupled to the projectile casing, a wing assembly that is coupled to the projectile casing and selectively moveable upon actuation between a closed position in which the locking mechanism locks the wing assembly against the projectile casing such that outer surfaces of the wing assembly form part of an outer surface of the projectile casing and a deployed position in which the locking mechanism releases the wing assembly to enable free ends of the wing assembly to deploy away from the projectile easing casing while other ends of the wing assembly remain coupled to the projectile casing; an inertial measurement unit (IMU), an altimeter module, a microcontroller coupled to the IMU and to the altimeter, and a propulsion system comprising at least one rotor that is disposed on the wing assembly to generate lift;
   firing the explosive round from the grenade launcher to cause the propelling charge to propel the projectile casing, the cartridge to detach from the projectile casing and the UAV to be launched from the grenade launcher into a substantially parabolic ballistic trajectory while the locking mechanism locks the wing assembly against the projectile casing;
   estimating, by the microcontroller, a trajectory of the UAV from signals from the IMU and the altimeter after launch;

determining, by the microcontroller, when the UAV passes through an apogee of the substantially parabolic ballistic trajectory;

when the UAV is determined to have passed through the apogee of the substantially parabolic trajectory,
- providing a signal to enable the wing assembly to deploy away from the projectile casing,
- controlling, by the microcontroller, the propulsion system to provide lift to transition the UAV to an autonomous phase of flight toward a target, according to signals provided by the altimeter and the IMU; and
- causing the round to explode at the target and fragment the projectile casing.

19. A method according to claim 18, wherein after transitioning, the UAV departs from the substantially parabolic trajectory.

20. A method according to claim 18, further comprising guiding the UAV to a target.

21. A method according to claim 18, wherein the grenade launcher comprises a 40-mm grenade launcher.

* * * * *